Feb. 12, 1924.
J. L. CREVELING
LUBRICATING SYSTEM
Original Filed Oct. 11, 1920
1,483,651
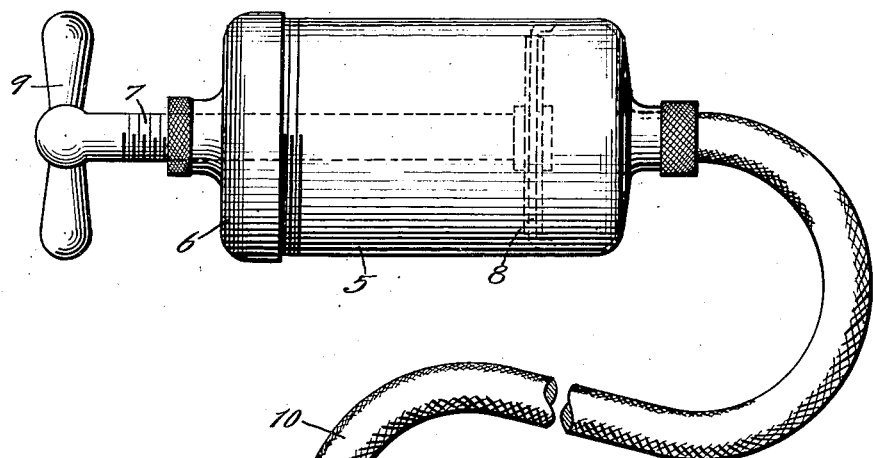
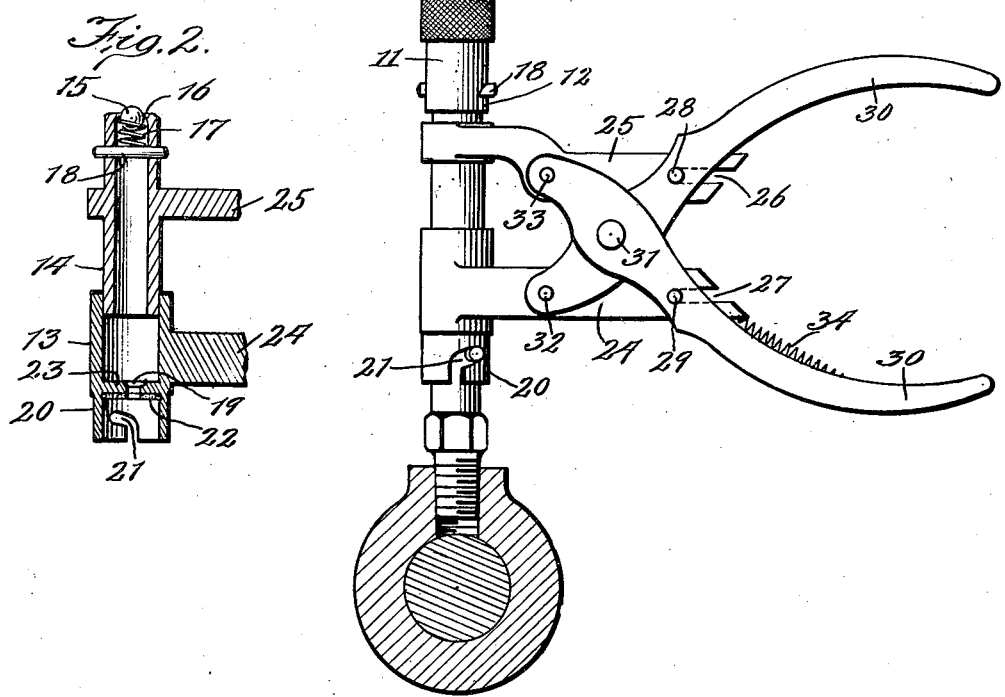
Inventor:
John L. Creveling Patented Feb. 12, 1924.

1,483,651

UNITED STATES PATENT OFFICE.

JOHN L. CREVELING, OF ORACLE, ARIZONA, ASSIGNOR TO THE BASSICK MANUFACTURING COMPANY, OF CHICAGO, ILLINOIS, A CORPORATION OF DELAWARE.

LUBRICATING SYSTEM.

Original application filed October 11, 1920, Serial No. 416,148. Divided and this application filed July 20, 1923. Serial No. 652,730.

*To all whom it may concern:*

Be it known that I, JOHN L. CREVELING, a citizen of the United States, and resident of Oracle, in the county of Pinal and State of Arizona, have invented a certain new and useful Improvement in Lubricating Systems, of which the following is a full, clear, concise, and exact description, reference being had to the accompanying drawings, forming a part of this specification.

My invention relates to improvements in lubricating systems, and is particularly concerned with certain improvements in that type of lubricating system which comprises a plurality of nipples or fittings which are attached to the bearings to be lubricated, and a compressor having means for successively making sealed connections with the various fittings or nipples and forcing lubricant under pressure into the same.

Systems of the character described above are now in common use and are designed so as to be able to force lubricant under high pressures into the various bearings. Most of these systems comprise a compressor having a screw threaded plunger rod or some other means for subjecting the lubricant in the compressor to comparatively high pressures, but with practically all of these compressors, it is a difficult matter for the ordinary person to produce pressures of more than 300, 400 or 500 pounds per square inch. It frequently happens that pressures very much in excess of this are required to force the lubricant through a bearing which has for some time been neglected. Such bearings sometimes require pressure as high as from 3000 to 5000 pounds, and the development of these pressures is practically impossible with the ordinary compressor.

The objects of my invention are:

First: To provide a system of the character described, embodying means whereby the pressure on the lubricant can be increased as desired, whenever such increased pressures are necessary to force the lubricant into the bearing.

Second: To provide a compressor such as described, in which the means for effecting the high pressures does not interfere with the ordinary operation of the compressor.

Third: To provide a construction such as described, comprising a comparatively low pressure cylinder or compressor having a discharge conduit to which is or may be secured a second cylinder or means for increasing the pressure upon the lubricant.

Fourth: To provide a system of the character referred to, in which the means for developing excessively pressures embodies means for preventing the high pressures developed therein from being communicated to the other portions of the appartus which are not designed to withstand such high pressures.

Fifth: To provide a high pressure or booster pump which can be easily attached to and detached from the ordinary compressor.

Other objects of my invention will appear as this description progresses, reference being had to the accompanying drawings, in which—

Figure 1 is a side elevation of a lubricating system embodying my invention, shown in use for supplying lubricant to a bearing which is shown in cross-section, and Figure 2 is a vertical transverse section through the high pressure element of my improved lubricating system.

In the drawings, I have illustrated my invention as embodying the usual commercial compressor, comprising the barrel 5 having the removable cap 6, in which is threaded the piston rod 7, the inner end of which carries a suitable plunger 8, and the outer end of which is provided with a handle 9 by means of which it can be rotated. The barrel 5 is provided with a discharge conduit 10 which is here illustrated as being of a flexible type. This conduit ends in a coupling member 11 which is of well known construction, and provided with bayonet slots 12 which are adapted to receive the ends of the pins projecting from the sides of the well known fitting or nipple of commerce.

The compresssor described above is capable of producing pressures of 300 to 500 pounds without undue exertion, but in order to produce higher pressures, and particularly pressures amounting to several thousand pounds per square inch, I provide a high pressure or booster pump, which comprises the high pressure chamber or cylinder 13, in which is slidably mounted a hollow plunger or piston 14. The outer end of this plunger is closed by means of a suitable closure 15, which is held in position upon its seat 16 by means of the compression spring 17, which is confined between the closure 15 and the pin 18, which extends through and the ends of which project beyond the sides of the plunger 14. The dimensions of the outer end of the plunger 14 and the position of the pin 18 are such that the coupling member 11 of the ordinary commercial compressor can be attached thereto and detached therefrom in the same manner in which it is attached to and detached from the ordinary commercial fitting.

The end of the high pressure chamber or cylinder 13 opposite the plunger 14 is closed with the exception of the discharge orifice 19, and is provided with a coupling member 20 having a bayonet slot 21 formed therein, the sides of which are inclined as shown in the drawings, so that when it is placed upon the commercial fitting and rotated in a clockwise direction, the inclined edges of the slot 21 will draw the coupling member 20 onto the fitting, thereby compressing the gasket 22 which rests against the end member 23 of the high pressure chamber, and effectually sealing the joint between the high pressure chamber and the fitting.

While any suitable means may be used for forcing the plunger 14 into the high pressure chamber 13, I prefer to accomplish this by means of the mechanism shown in Figure 1. Here the high pressure chamber 13 and the plunger 14 are provided with the parallel elements 24 and 25, the outer ends of which are notched as shown at 26 and 27 to receive the pins 28 and 29 respectively, carried by the cross handle members 30. These handles are pivotally connected together as shown at 31, and the inner ends thereof are pivotally connected with the members 24 and 25 by means of the pivot pins 32 and 33 respectively. A spring 34 may, if desired, be provided for tending to urge the handles 30 to their open position.

In the use of my improved system, the high pressure element may, if desired, be continuously attached to the compressor comprising the barrel 5, the conduit 10, and the coupling 11, in which case the handles 30 may be used for manipulating the coupling 20 to attach it to and disconnect it from the various fittings which are to receive lubricant. When attached to a fitting, the operator merely turns the handle 9, whereupon the lubricant is forced from the compressor 5, conduit 10, coupling member 11, hollow plunger 14, high pressure chamber 13, and discharge opening 19, into the fitting. If the operator encounters a bearing which offers so much resistance that it is difficult to force lubricant thereinto by rotation of the handle 9, all that it is necessary for him to do is to move the handles 30 toward each other, whereupon the plunger 14 is forced into the high pressure chamber 13, thereby placing pressure upon the lubricant in the plunger 14 and the chamber 13, which holds the closure 15 upon its seat, and thereby prevents the high pressure developed in the booster element from being communicated to the coupling 11, conduit 10 and barrel 5.

By properly proportioning or dimensioning the high pressure chamber 13, the plunger 14 and the operating mechanism, any desired pressure can be exerted upon the lubricant in the high pressure chamber without undue exertion on the part of the operator.

This application is a division of my co-pending application, Serial Number 416,148, filed October 11, 1920.

Having thus described my invention, what I claim is:

1. The combination with a lubricant compressor having a discharge conduit provided at its free end with a coupling member for making a detachable connection with a lubricant receiving nipple, of means for increasing the pressure on the lubricant delivered to the nipple, comprising a high pressure pump, means for detachably connecting the intake of said pump with said coupling member, and means for detachably connecting the discharge conduit of said pump with a lubricant receiving nipple.

2. The combination with a lubricant compressor having a discharge conduit provided at its free end with a coupling member for making a detachable connection with a lubricant receiving nipple, of detachable means interposed between said coupling and said nipple for increasing the pressure on the lubricant delivered to the nipple.

3. The combination with a lubricant compressor having a discharge conduit provided at its free end with a coupling member for making a detachable connection with a lubricant receiving nipple, of means secured to said connecting means for increasing the pressure upon the lubricant delivered to said nipple.

4. A lubricant compressor, comprising a pump having an intake for making a detachable connection with the discharge conduit of a main compressor, and a discharge conduit for making a detachable connection with a lubricant receiving nipple, a non-return valve for said intake, and a device in said discharge conduit for making a sealed connection with a lubricant receiving nipple.

5. A lubricant compressor, comprising a pump having an intake for making a detachable connection with the discharge conduit of a main compressor, and a discharge conduit for making a detachable connection with a lubricant receiving nipple, and a device in said discharge conduit for making a sealed connection with a lubricant receiving nipple.

In witness whereof, I hereunto subscribe my name this 12th day of July, 1923.

JOHN L. CREVELING.